US005555776A

United States Patent [19]
Gazza

[11] Patent Number: 5,555,776
[45] Date of Patent: Sep. 17, 1996

[54] CAM INTEGRATED WITH A ROTATION SENSOR

[75] Inventor: Jack M. Gazza, Tucson, Ariz.

[73] Assignee: International Business Machines Corporation, Armonk, N.Y.

[21] Appl. No.: 345,441

[22] Filed: Nov. 21, 1994

[51] Int. Cl.$^6$ .................................. F16H 53/00
[52] U.S. Cl. ........................ 74/567; 250/231.13
[58] Field of Search ............... 74/567–569; 250/231.13

[56] References Cited

U.S. PATENT DOCUMENTS

| 3,714,435 | 1/1973 | Bestenreiner et al. | 250/83.3 H |
| 4,031,386 | 6/1977 | Recker | 250/230 |
| 4,426,145 | 1/1984 | Hashimoto | 354/195.1 |
| 4,475,034 | 10/1984 | Maddox et al. | 250/231 SE |
| 4,500,870 | 2/1985 | Krohn et al. | 250/23 SE X |
| 4,794,250 | 12/1988 | Togami | 250/231 SE |
| 4,866,269 | 9/1989 | Wlodarczyk et al. | 250/231.13 |
| 5,021,648 | 6/1991 | Jones | 250/231.13 |
| 5,057,684 | 10/1991 | Service | 250/231.13 |
| 5,126,560 | 6/1992 | Kraus | 250/231.13 |
| 5,235,189 | 8/1993 | Montagu | 250/231.13 |

FOREIGN PATENT DOCUMENTS

| 0131900 | 1/1985 | European Pat. Off. . | |
| 0497486 | 8/1992 | European Pat. Off. . | |
| 59-211823 | 11/1984 | Japan | 250/231.13 |
| 1-173807 | 10/1989 | Japan | 250/231.13 |

OTHER PUBLICATIONS

T. K. Praggastis, et al., "Shaft Rotation Monitor", Jun., 1979 IBM Tech. Discl. Bulletin, vol. 22, No. 1, pp. 32–33.

*Primary Examiner*—Vinh T. Luong
*Attorney, Agent, or Firm*—D. A. Shifrin; F. E. Anderson

[57] ABSTRACT

A gear constructed of a monolithic material having a first reflectivity and having one or more projections is interlocked into a cam constructed of a monolithic material having a second reflectivity substantially different from the first reflectivity. The one or more projections are mated with corresponding one or more openings in the gear whereby such mating provides a torsional lock. A reflective sensor having a focal length corresponding to either a surface of the projections or a surface of the cam detects positions of the gear by transitions from reflective to non-reflective surfaces and vice versa. The detected transitions are used to provide feedback control to a motor driving the gear.

15 Claims, 3 Drawing Sheets

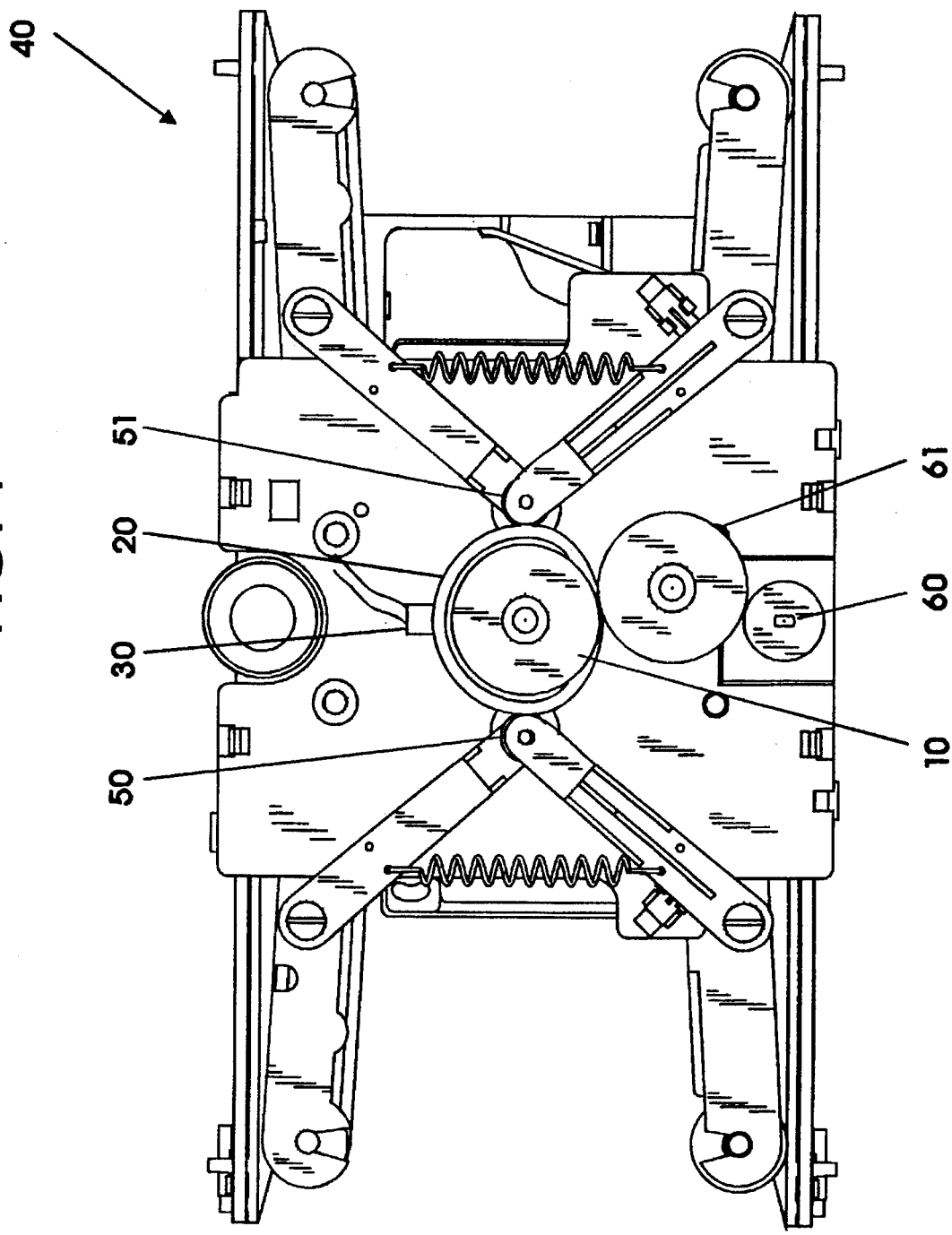

CAM INTEGRATED WITH A ROTATION SENSOR

FIELD OF THE INVENTION

The present invention relates generally to mechanical driver elements, and more particularly, to an apparatus and method for detecting and controlling the position of the driver elements.

BACKGROUND OF THE INVENTION

Mechanical systems frequently employ a cam to convert rotary motion into linear motion. A typical system uses a cam as a rotary input element and a cam follower is used to provide linear output. The cam follower is kept in contact with the cam's perimeter, and the cam having a perimeter that is eccentric with its axis of rotation, will cause the cam follower to reciprocate as the cam is rotated.

The cam, providing the input motion in such a system, is often attached directly to a motor shaft. However, there exists many applications where the cam cannot be mounted directly to the motor shaft because of space constraints, or in other instances wherein the cam follower is required to be placed at a distance from the motor. In these applications, provisions must be made to transfer the motor's rotation to the cam without interfering with the cam follower.

Many applications utilizing a cam require the cam to be rotated incrementally. In applications where the cam is incrementally driven, the rotation of the cam must be controlled to prevent over-travel and subsequent mispositioning of the cam follower. These applications will often use an encoder on the driving motor, or an encoder assembled to the cam to provide the feedback necessary to control the cam's rotation. In systems where the cam is not attached to the motor, the encoder must be assembled to the cam to eliminate the backlash in the drive train (belt, gear, etc.) between the motor and the cam. For example, an angle of rotation is detected on a steering column by attaching a cam to the column (driving mechanism) and further attaching a sleeve having reflective and non-reflective patterns to the cam. A sensor detects the sleeve's pattern for determining an angle of rotation. The interface of the sleeve to the cam can introduce error due to mechanical tolerances and backlash. In addition the sleeve has to be treated (made of two materials, painted, etched, etc.) to provide the differing reflective surfaces, and still further the sleeve represents an additional part introduced into the assembly process.

What is needed is a method and apparatus to integrate the driver element for the cam and the cam's encoder, and directly detect the rotational position of the driver element. This improvement would eliminate a separate encoder, as well as overcoming the undesired backlash and free play that can result in inaccurate cam rotation.

SUMMARY OF THE INVENTION

An object of the present invention is to provide a mechanical driver having an improved positioning encoder.

Another object of the present invention is to provide a cam and gear that provide improved position sensing information.

According to a first embodiment of the present invention a mechanical driver and position sensing apparatus is provided comprising a cam having a first opening, wherein the cam has a first reflectivity, and a gear having a first projection adapted for mating with the first opening such that a surface of the first projection protrudes through the first opening, the first projection having a second reflectivity substantially different than the first reflectivity. A sensor is located proximate the cam and first projection for sensing transitions between the first and second reflectivities and indicating a predetermined rotation of the cam and gear.

According to a second embodiment of the present invention a method of sensing a rotational position of a gear used for driving a cam is provided. The position sensing method comprises steps of: (a) nesting a first projection of the gear in a first opening of the cam and forming a torsional lock, wherein the gear has a first reflectivity and the cam has a second reflectivity, and further wherein the first projection has a predetermined shape for providing desired cam rotation position information; (b) rotating the gear and sensor in a first direction; and (c) sensing a transition between the first and second reflectivities for indicating the desired cam rotation position.

BRIEF DESCRIPTION OF THE DRAWING

FIG. 4 is a side view of an assembly implementing the cam and driver element (gear) with multiple cam followers.

DETAILED DESCRIPTION OF THE INVENTION

Figure 1:
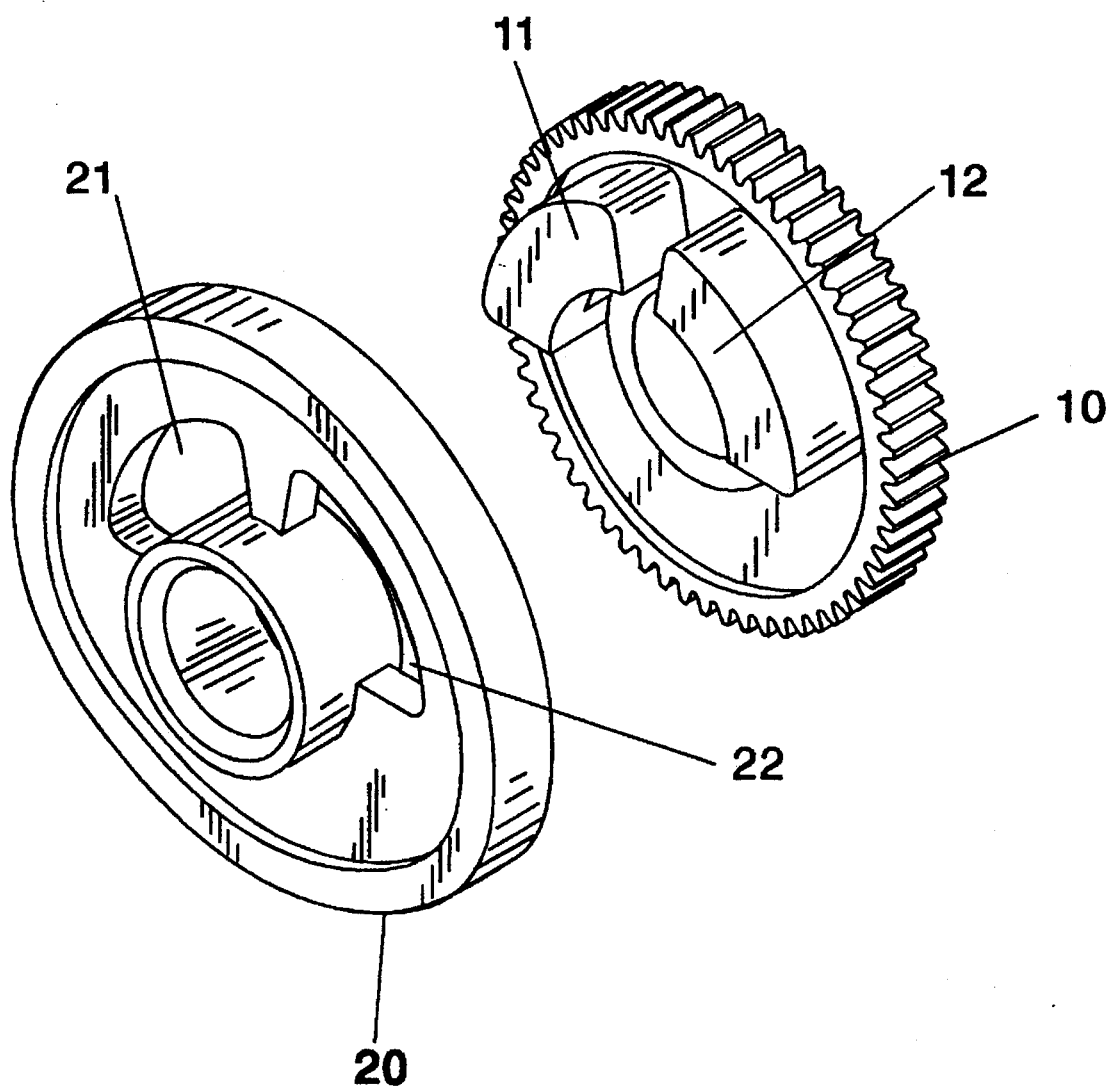
FIG. 1 is a perspective view of a cam and a driver element (gear) showing the nesting features of each.

Referring now to the drawing, like numerals correspond to like parts depicted in the several figures. The invention will be described as a cam coupled to a gear (the driver element), with two reflective surfaces providing the feedback for positioning. One skilled in the art will recognize that the invention equally applies to alternate driver elements, such as a pulley or friction wheel, and can contain any number of reflective surfaces for positioning. Furthermore, the embodiment is not meant to limit the invention to positioning a cam, but can be used to position any rotary elements, such as a rack and pinion system or a cluster gear train.

FIG. 1 illustrates the nesting features of a cam 20 and a gear 10. The gear 10 has two projections 11 and 12 that nest with two openings 21 and 22, respectively, in the cam 20. These projections 11 and 12 provide a torsional lock between the cam 20 and gear 10, and thus allow the cam 20 to be driven by rotating the gear 10. The gear 10 is made of a material which is reflective (the type of material, whether steel, plastic or other material, is determined by applicable cost, strength or other requirements), while the cam 20 is made of a material with low reflectiveness or is non-reflective. One method of achieving this is by making the gear 10 white and making the cam 20 black (non-reflective). Alternately, the reflective properties of the gear 10 and the cam 20 may be reversed. An advantage of the invention is that the gear 10 and/or cam 20 may be made monolithically. Thus, the projections 11 and 12 and the gear 10 are made of like material all having like reflectivity thus reducing manufacturing complexity and costs.

The openings 21 and 22 in the cam 20 may be molded or machined into the cam 20 along with the cam's profile. Since the projections 11 and 12 of the gear 10 mate with the openings 21 and 22, this would limit the tolerance accumulation between the cam's profile and the projections 11 and 12. In an alternative embodiment, the projections 11 and 12 may have differing shapes and/or heights (translating into different focal points for each projection 11 and 12). In such an alternative embodiment, a second or other reflective sensor (not shown) may be incorporated for detecting one projection having a matching focal length while ignoring the other projection.

Figure 2:
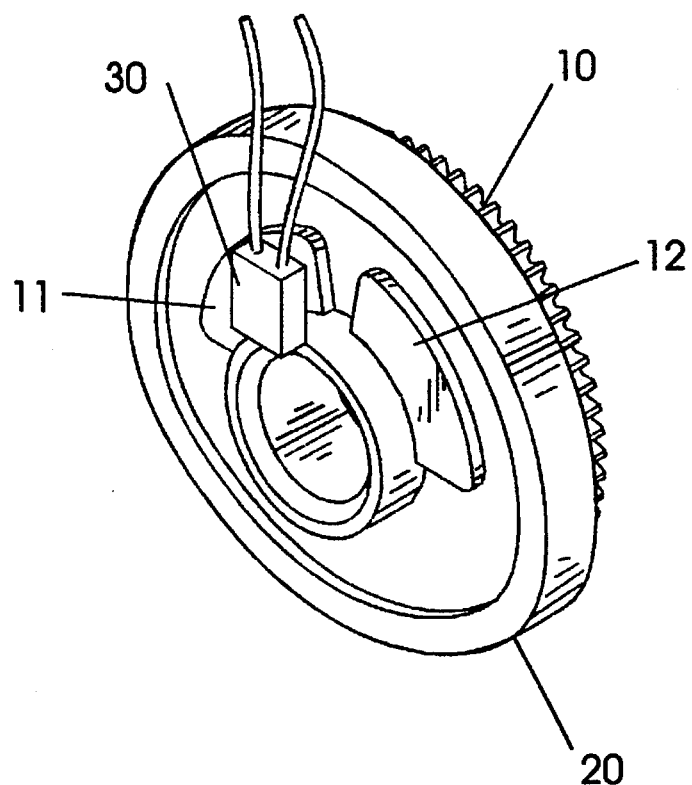
FIG. 2 is a front perspective view of an assembled cam and driver element (gear) illustrating the reflective surfaces and the position of the reflective sensor.
Figure 3:
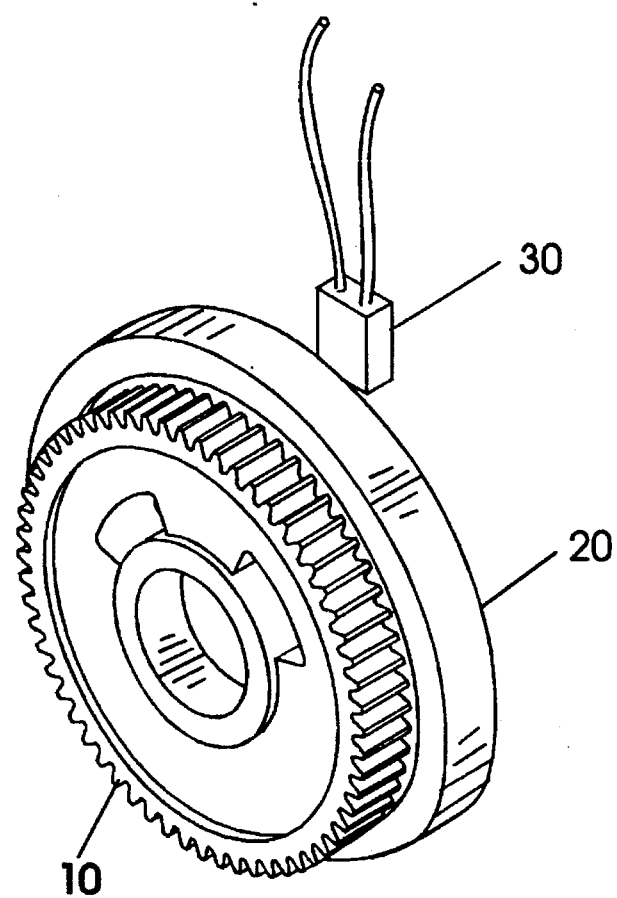
FIG. 3 is a rear perspective view of an assembled cam and driver element (gear) in relationship to the reflective sensor.

FIG. 2 shows a front perspective view while FIG. 3 shows a back perspective view of the assembled cam 20 and gear 10. As can been seen, the projections 11 and 12 when nested with the cam 20 form a reflective/non-reflective pattern. A reflective sensor 30 is positioned on the side of the cam 20 opposite the gear 10, and is used to distinguish between the projections 11 and 12 and the cam 20. The projections 20 and 21 should be manufactured to be in the same plane with a focal point of the reflective sensor 30. Since reflective sensors are made with a variety of focal lengths, various locations of the reflective sensor 30 are possible.

FIG. 4 shows a gripping device 40 which incorporates the cam 20 and gear 10. In this gripping device 40 the cam 20 is used to actuate two cam followers 50 and 51 placed on opposite sides of the cam 20. The cam 20 is rotated by the gear 10 via an idler gear 61 and a motor with a pinion 60. The projections 11 and 12 of the gear 10 are on the backside in this view. As the cam 10 rotates the projections 11 and 12 are detected by the reflective sensor 30.

METHOD OF OPERATION

Referring to FIG. 2, the projections 11 and 12 on the gear 10 when nested into the cam 20 form a reflective/non-reflective pattern that the reflective sensor 30 is able to distinguish. When the cam 20 is driven by the gear 10 and rotates, either projection 11 or 12 will be detected by the reflective sensor 30. The motion of the cam 20 may be stopped when the projection 11 or 12 is first detected, or permitted to continue until the projection 11 or 12 has passed beyond the focal point of reflective sensor 30. In either case, the cam 10 rotation can be controlled by using the reflective sensor 30 to detect a leading edge or a trailing edge of the projection 11 or 12. The leading and trailing edges of the projections 11 and 12 provide a transition from a reflective to a non-reflective surface or vice versa. Any incremental cam rotation can be achieved by employing a gear projection whose arc length is proportional to the angle that the cam is rotated.

Although the invention is not meant to be limited to the projection pattern shown, using multiple gear projections permits independent operation of multiple cam followers while using a single cam. Referring again to FIG. 4, this application uses two cam followers 50 and 51 placed on opposite sides of the cam 20. When the cam 20 is rotated in a clockwise direction, the cam follower 50 on the left is actuated. At the same time, the cam follower 51 on the right remains stationary because the cam follower 51 is following a constant radius on the cam 20. Conversely, if the cam 20 were to be rotated in a counterclockwise direction, the right cam follower 51 is actuated while the left cam follower 50 remains stationary. This example can be extrapolated to a system using multiple cam followers, each with a matching reflective projection on the gear (driver element) that would allow for each cam follower to be independently actuated.

The cam and gear arrangement described herein provides a method to increment a cam and detect the cam's position. By providing projections on the gear which nest through the cam, a reflective/non-reflective pattern is made. This pattern is detected by a reflective sensor and is used to control the rotation of the cam. Hence, the gear's projections serve two functions: a torsional lock between the cam and its driving element, and the projections provide a pattern which can be used to control the cam's motion. The result is that the cam can be offset from its driving motor and the systems backlash and free play is limited. Additionally, multiple gear projections allow for a system using a single cam to contain multiple cam followers, each which can be actuated independently of one another.

In summary, a mechanical driver and position sensing apparatus has been described wherein an eccentric cam has first and second openings, and the cam is monolithically constructed of a single material having a first reflectivity. A gear has corresponding first and second projections adapted for mating with the first and second openings, respectively, such that a surface of the first and second projections extend through the first and second openings, respectively, the gear monolithically constructed such that the first and second projections have a second reflectivity substantially different than the first reflectivity. The first and second projections (and first and second openings) have arc lengths corresponding to desired degrees of rotation of the cam. A motor is coupled to the gear for providing torsional power thereto. First and second cam followers are driven by the cam for providing first and second linear motions, for example, for opening and closing first and second grippers, respectively. A sensor is located proximate to the first and second projections and the cam for sensing transitions between the first and second reflectivities and indicating a predetermined rotation of the gear and cam, and hence predetermined linear travels of said first and second cam followers. The sensor has a predetermined focal length corresponding to the heights of the first and second projections.

While the invention has been particularly shown and described with reference to preferred embodiments thereof, it will be understood by those skilled in the art that various changes in form and details may be made therein without departing from the spirit and scope of the invention. For example, various changes may be made to certain materials as long as the critical requirements are met, for example, weight, strength, etc. Still further, means for attaching structures together may be changed without departing from the scope of the invention. The openings of the cam and the projections of the gear can be transposed so that the projections are on the cam and the openings are in the gear, wherein the sensor is moved to sense reflective transitions accordingly.

What is claimed is:

1. A mechanical driver and position sensing apparatus, comprising:

a cam having a first opening, the cam having a first reflectivity;

a gear having a first projection adapted for mating with said first opening such that a surface of said first projection protrudes through said first opening, the first projection having a second reflectivity different than said first reflectivity; and a sensor located for sensing said first and second reflectivities and indicating a predetermined rotation of said cam and gear by sensing a transition between said first and second reflectivities.

2. The mechanical driver and position sensing apparatus according to claim 1 wherein said cam is constructed from a first monolithic material.

3. The mechanical driver and position sensing apparatus according to claim 2 wherein said gear is constructed from a second monolithic material, wherein said gear and said first projection have said second reflectivity.

4. The mechanical driver and position sensing apparatus according to claim 1 wherein said sensor is an optical sensor having a focal point substantially equal to a distance measured from said optical sensor to said surface of said first projection.

5. The mechanical driver and position sensor apparatus according to claim 3 wherein said cam is reflective and said gear has a low reflectivity relative to said cam.

6. The mechanical driver and position sensor apparatus according to claim 3 wherein said gear is reflective and said cam has a low reflectivity relative to said gear.

7. The mechanical driver and position sensor apparatus according to claim 3 wherein said first projection and said first opening provide a torsional lock.

8. The mechanical driver and position sensor apparatus according to claim 3 further comprising a motor coupled for driving said gear.

9. The mechanical driver and position sensor apparatus according to claim 8 further comprising a cam follower coupled for converting a rotation of said cam into a linear motion.

10. The mechanical driver and position sensor apparatus according to claim 3 wherein said cam includes a second opening.

11. The mechanical driver and position sensor apparatus according to claim 10 wherein said gear includes a second projection adapted to be mated with said second opening such that a surface of said second projection protrudes beyond said second opening.

12. The mechanical driver and position sensor apparatus according to claim 11 wherein said first and second projections protrude through said first and second openings, respectively, by substantially an equal distance.

13. The mechanical driver and position sensor apparatus according to claim 11 wherein said first and second projections protrude through said first and second openings, respectively, by first and second distances, respectively.

14. A mechanical driver and position sensing apparatus, comprising:

a cam having a first projection, the cam having a first reflectivity;

a gear having a first opening adapted for mating with said first projection such that a surface of said first projection protrudes through said first opening, the first projection having a second reflectivity different than said first reflectivity; and a sensor located for sensing said first and second reflectivities and indicating a predetermined rotation of said cam and gear by sensing a transition between said first and second reflectivities.

15. A mechanical driver and position sensing apparatus, comprising:

an eccentric cam having at least first and second openings, the cam monolithically constructed and having a first reflectivity;

a gear having at least first and second projections adapted for mating with said first and second openings, respectively, such that a surface of said first and second projections extend through said first and second openings, respectively, the gear monolithically constructed such that the first and second projections have a second reflectivity different than said first reflectivity, said first and second projections having arc lengths related to desired degrees of rotation of said cam;

a motor coupled for rotating said gear;

first and second cam followers driven by said cam for providing first and second linear motions, respectively; and a sensor located for sensing said first and second reflectivities and indicating a predetermined rotation of said gear and cam, and hence predetermined linear travels of said first and second cam followers, by sensing a transition between said first and second reflectivities.

* * * * *